US012401566B2

United States Patent
Semerjyan et al.

(10) Patent No.: US 12,401,566 B2
(45) Date of Patent: Aug. 26, 2025

(54) DEVICES FOR FACILITATING STREAMING IN A LOCAL NETWORK WITH A CLIENT-SERVER ARCHITECTURE

(71) Applicant: DISH Network L.L.C., Englewood, CO (US)

(72) Inventors: Aram Semerjyan, Aurora, CO (US); Shiqiang Chu, Highlands Ranch, CO (US)

(73) Assignee: DISH Network L.L.C., Englewood, CO (US)

( * ) Notice: Subject to any disclaimer, the term of this patent is extended or adjusted under 35 U.S.C. 154(b) by 58 days.

(21) Appl. No.: 17/887,343

(22) Filed: Aug. 12, 2022

(65) Prior Publication Data
US 2023/0047422 A1 Feb. 16, 2023

Related U.S. Application Data

(60) Provisional application No. 63/232,552, filed on Aug. 12, 2021.

(51) Int. Cl.
*H04N 21/81* (2011.01)
*G06F 8/41* (2018.01)
(Continued)

(52) U.S. Cl.
CPC ............ *H04L 41/0893* (2013.01); *G06F 8/45* (2013.01); *G06F 8/451* (2013.01); *G06F 8/453* (2013.01);
(Continued)

(58) Field of Classification Search
CPC ............ H04N 21/433; H04N 21/4518; H04N 21/238; H04N 21/26291; H04N 21/2665;
(Continued)

(56) References Cited

U.S. PATENT DOCUMENTS

| 7,617,515 B1 | 11/2009 | Laksono |
| 8,863,202 B2 | 10/2014 | Agnihotri et al. |

(Continued)

FOREIGN PATENT DOCUMENTS

| CN | 108259231 A | 7/2018 |
| WO | 2017/102389 A1 | 6/2017 |

OTHER PUBLICATIONS

Thomson et al. "IPv6 Stateless Address Autoconfiguration" Network Working Group, RFC 4862, Sep. 2007, 30 pages.
(Continued)

*Primary Examiner* — Junior O Mendoza
(74) *Attorney, Agent, or Firm* — Kilpatrick Townsend & Stockton LLP

(57) ABSTRACT

Systems, methods, and non-transitory, machine-readable media to facilitate streaming in a local network with a client-server architecture are disclosed. A configuration tool may configure a primary media device to perform operations with respect to a local network. The configuration tool may be adapted to communicatively couple with the primary media device via at least one interface of the one or more interfaces to configure the primary media device to perform the operations with respect to the local network. The primary media device may be configured with the configuration tool to operate as a server in the local network, receive first audio/video (A/V) content via an Internet connection and/or a satellite network connection, and receive second A/V content via the Internet connection and/or the satellite network connection.

20 Claims, 5 Drawing Sheets

(51) Int. Cl.
| | |
|---|---|
| *G06F 8/70* | (2018.01) |
| *G06F 9/44* | (2018.01) |
| *G06F 9/451* | (2018.01) |
| *G10L 15/22* | (2006.01) |
| *H04B 7/185* | (2006.01) |
| *H04L 41/0893* | (2022.01) |
| *H04L 61/50* | (2022.01) |
| *H04L 61/5014* | (2022.01) |
| *H04L 65/611* | (2022.01) |
| *H04N 21/238* | (2011.01) |
| *H04N 21/262* | (2011.01) |
| *H04N 21/2665* | (2011.01) |
| *H04N 21/433* | (2011.01) |
| *H04N 21/4363* | (2011.01) |
| *H04N 21/45* | (2011.01) |
| *H04N 21/462* | (2011.01) |
| *H04N 21/475* | (2011.01) |
| *H04N 21/478* | (2011.01) |
| *H04N 21/61* | (2011.01) |
| *G06F 9/445* | (2018.01) |
| *H04L 101/668* | (2022.01) |

(52) U.S. Cl.
CPC ............ *G06F 8/70* (2013.01); *G06F 9/44* (2013.01); *G06F 9/451* (2018.02); *G10L 15/22* (2013.01); *H04B 7/18523* (2013.01); *H04L 61/50* (2022.05); *H04L 61/5014* (2022.05); *H04L 65/611* (2022.05); *H04N 21/238* (2013.01); *H04N 21/26291* (2013.01); *H04N 21/2665* (2013.01); *H04N 21/433* (2013.01); *H04N 21/43637* (2013.01); *H04N 21/4516* (2013.01); *H04N 21/4518* (2020.08); *H04N 21/4622* (2013.01); *H04N 21/475* (2013.01); *H04N 21/478* (2013.01); *H04N 21/6106* (2013.01); *H04N 21/6118* (2013.01); *H04N 21/6125* (2013.01); *H04N 21/6143* (2013.01); *H04N 21/818* (2013.01); *G06F 9/44521* (2013.01); *G10L 2015/223* (2013.01); *H04L 2101/668* (2022.05)

(58) Field of Classification Search
CPC ......... H04N 21/43637; H04N 21/4516; H04N 21/4622; H04N 21/475; H04N 21/478; H04N 21/6106; H04N 21/6118; H04N 21/6125; H04N 21/6143; H04N 21/818; G06F 9/451; G06F 9/44; G06F 9/44521; G06F 8/45; G06F 8/451; G06F 8/453; G06F 8/70; H04L 61/5014; H04L 65/611; H04L 41/0893; H04L 2101/668; G10L 15/22; G10L 2015/223; H04B 7/18523
USPC ....................................................... 725/109
See application file for complete search history.

(56) References Cited

U.S. PATENT DOCUMENTS

| | | |
|---|---|---|
| 10,091,065 B1 | 10/2018 | Gast et al. |
| 10,349,059 B1 | 7/2019 | Good |
| 11,122,325 B1 | 9/2021 | Gupta et al. |
| 11,184,660 B1 | 11/2021 | Ewanchuk et al. |
| 11,227,620 B2 | 1/2022 | Igarashi |
| 11,330,335 B1 | 5/2022 | Loritsch et al. |
| 2006/0200849 A1 | 9/2006 | Sundarrajan et al. |
| 2007/0174635 A1 | 7/2007 | Jones |
| 2009/0254639 A1* | 10/2009 | Manchester .......... H04L 63/061 714/48 |
| 2009/0316706 A1 | 12/2009 | Hawley et al. |
| 2010/0037271 A1 | 2/2010 | Crowe |
| 2010/0235869 A1* | 9/2010 | Zhao ...................... G06F 21/57 725/82 |
| 2011/0158149 A1 | 6/2011 | Mugulavalli et al. |
| 2012/0019732 A1 | 1/2012 | Lee et al. |
| 2012/0173746 A1 | 7/2012 | Salinger et al. |
| 2013/0031592 A1 | 1/2013 | Choi et al. |
| 2013/0129324 A1 | 5/2013 | Uro et al. |
| 2013/0185761 A1 | 7/2013 | Friel et al. |
| 2013/0223441 A1 | 8/2013 | Meyer et al. |
| 2014/0075467 A1 | 3/2014 | Chritudass et al. |
| 2014/0153489 A1 | 6/2014 | Perras et al. |
| 2014/0227976 A1 | 8/2014 | Callaghan et al. |
| 2015/0074735 A1 | 3/2015 | Herigstad et al. |
| 2015/0326921 A1 | 11/2015 | Makovetsky et al. |
| 2017/0019372 A1 | 1/2017 | Panje |
| 2017/0026712 A1* | 1/2017 | Gonder ................. H04L 65/80 |
| 2017/0155580 A1 | 6/2017 | Ramanujan et al. |
| 2017/0180790 A1 | 6/2017 | Howard |
| 2017/0251026 A1 | 8/2017 | Straub et al. |
| 2017/0331885 A1* | 11/2017 | Jakatdar ............... H04L 67/141 |
| 2018/0070129 A1* | 3/2018 | Cholas ............... H04N 21/4332 |
| 2018/0146113 A1 | 5/2018 | Takahashi |
| 2018/0176101 A1 | 6/2018 | Stephenson et al. |
| 2019/0090154 A1 | 3/2019 | Olderdissen et al. |
| 2019/0166387 A1 | 5/2019 | Perez |
| 2020/0005735 A1 | 1/2020 | Kim et al. |
| 2020/0379747 A1 | 12/2020 | Kaartinen et al. |
| 2021/0051091 A1 | 2/2021 | Joseph et al. |
| 2021/0127168 A1 | 4/2021 | Perez |
| 2021/0219017 A1 | 7/2021 | Pattison et al. |
| 2021/0241764 A1 | 8/2021 | Shin |
| 2021/0385550 A1 | 12/2021 | Jothilingam et al. |
| 2022/0337745 A1 | 10/2022 | Gu et al. |
| 2022/0385988 A1 | 12/2022 | DiNatale et al. |
| 2023/0052067 A1 | 2/2023 | Chu et al. |

OTHER PUBLICATIONS

Dish Network Hopper 3 Demo by SilverStar Satellite—YouTube, Published Feb. 9, 2016, 3 pages.

\* cited by examiner

DEVICES FOR FACILITATING STREAMING IN A LOCAL NETWORK WITH A CLIENT-SERVER ARCHITECTURE

CROSS-REFERENCE TO RELATED APPLICATION

This application is a non-provisional of and claims the benefit of the filing date of U.S. Provisional Application No. 63/232,552, filed on Aug. 12, 2021, which is incorporated herein by reference in its entirety for all purposes.

TECHNICAL FIELD

This disclosure generally relates to techniques of facilitating smart TV content receivers, and more particularly to devices for facilitating streaming in a local network with a client-server architecture.

BACKGROUND

Television content receivers may be configured to receive and distribute digital content from a remote content provider within a local network of television content receivers. Smart television operating systems may provide users access to digital content from additional content providers as well as other computing functionalities, such as voice assistants and smart home integrations. As smart devices, digital content providers, and smart televisions become more ubiquitous, integration of smart television functionalities into local network connected television content receivers is needed. Integrating smart television functionalities into local network connected television content receivers may improve user satisfaction and reduce technological complexities.

Thus, there is a need for systems, methods, and processor-readable media that address the foregoing problems. This and other needs are addressed by the present disclosure.

BRIEF SUMMARY

Certain embodiments of the present disclosure relate generally to facilitating smart TV content receivers, and more particularly to devices for facilitating streaming in a local network with a client-server architecture.

In one aspect, system to facilitate streaming in a local network with a client-server architecture is disclosed. The system may include one or a combination of the following. A configuration tool may include one or more processing devices, one or more interfaces to communicatively couple with a primary media device, and memory communicatively coupled with and readable by the one or more processing devices and having stored therein processor-readable instructions which, when executed by the one or more processing devices, configure a primary media device to perform operations with respect to a local network. The configuration tool may be adapted to communicatively couple with the primary media device via at least one interface of the one or more interfaces to configure the primary media device to perform the operations with respect to the local network. The primary media device may be configured with the configuration tool to operate as a server in the local network, receive first audio/video (A/V) content via an Internet connection and/or a satellite network connection, and receive second A/V content via the Internet connection and/or the satellite network connection. The primary media device configured with the configuration tool may serve the first A/V content and the second A/V content to at least one secondary media device of a set of one or more secondary media devices that provides the first A/V content and the second A/V content for display with at least one television of a set of one or more televisions.

In one aspect, a method to facilitate streaming in a local network with a client-server architecture is disclosed. The method may include one or a combination of the following. A configuration tool may be adapted to configure a primary media device to perform operations with respect to a local network, and to communicatively couple with the primary media device via at least one interface to configure the primary media device to perform the operations with respect to the local network. The primary media device may be configured with the configuration tool to: operate as a server in the local network; receive first audio/video (A/V) content via an Internet connection and/or a satellite network connection; receive second A/V content via the Internet connection and/or the satellite network connection; and serve the first A/V content and the second A/V content to at least one secondary media device of a set of one or more secondary media devices that provides the first A/V content and the second A/V content for display with at least one television of a set of one or more televisions.

In yet another aspect, one or more non-transitory, machine-readable media having machine-readable instructions thereon are disclosed. The machine-readable instructions, when executed by one or more processing devices, may cause the one or more processing devices to perform one or a combination of the following operations. A primary media device may be configured to perform operations with respect to a local network. The configured primary media device may operate as a server in the local network; receive first audio/video (A/V) content via an Internet connection and/or a satellite network connection; receive second A/V content via the Internet connection and/or the satellite network connection; and serve the first A/V content and the second A/V content to at least one secondary media device of a set of one or more secondary media devices that provides the first A/V content and the second A/V content for display with at least one television of a set of one or more televisions.

In various embodiments, the configuration tool may be adapted to connect with the primary media device with a universal serial bus (USB) connection to configure the primary need advisor for the operations with respect to the local network. In various embodiments, the configuration tool and the primary media device may perform discovery operations with respect to one another consequent to the configuration tool being communicatively coupled to the primary media device. In various embodiments, consequent to completion of the discovery operations, the configuration tool may automatically configure the primary media device to perform the operations with respect to the local network. In various embodiments, the configuring the primary media device to perform the operations with respect to the local network may include transitioning the primary media device from a first operational mode to a second operational mod. In various embodiments, the configuring the primary media device to perform the operations with respect to the local network may include extending a range of functionalities of the primary media device. In various embodiments, each secondary media device of the set of one or more secondary media devices may operate as a client with respect to the primary media device in the local network. In various embodiments, the primary media device may transmit the first A/V content and the second A/V content to the at least one secondary media device via a Wi-Fi connection. In various embodiments, the primary media device may transmit the first A/V content and the second A/V content to the at least one secondary media device via a coaxial connection.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure relates in general to television devices, and, more specifically, but not by way of limitation, to systems and methods for facilitating smart TV content receivers in a local network.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
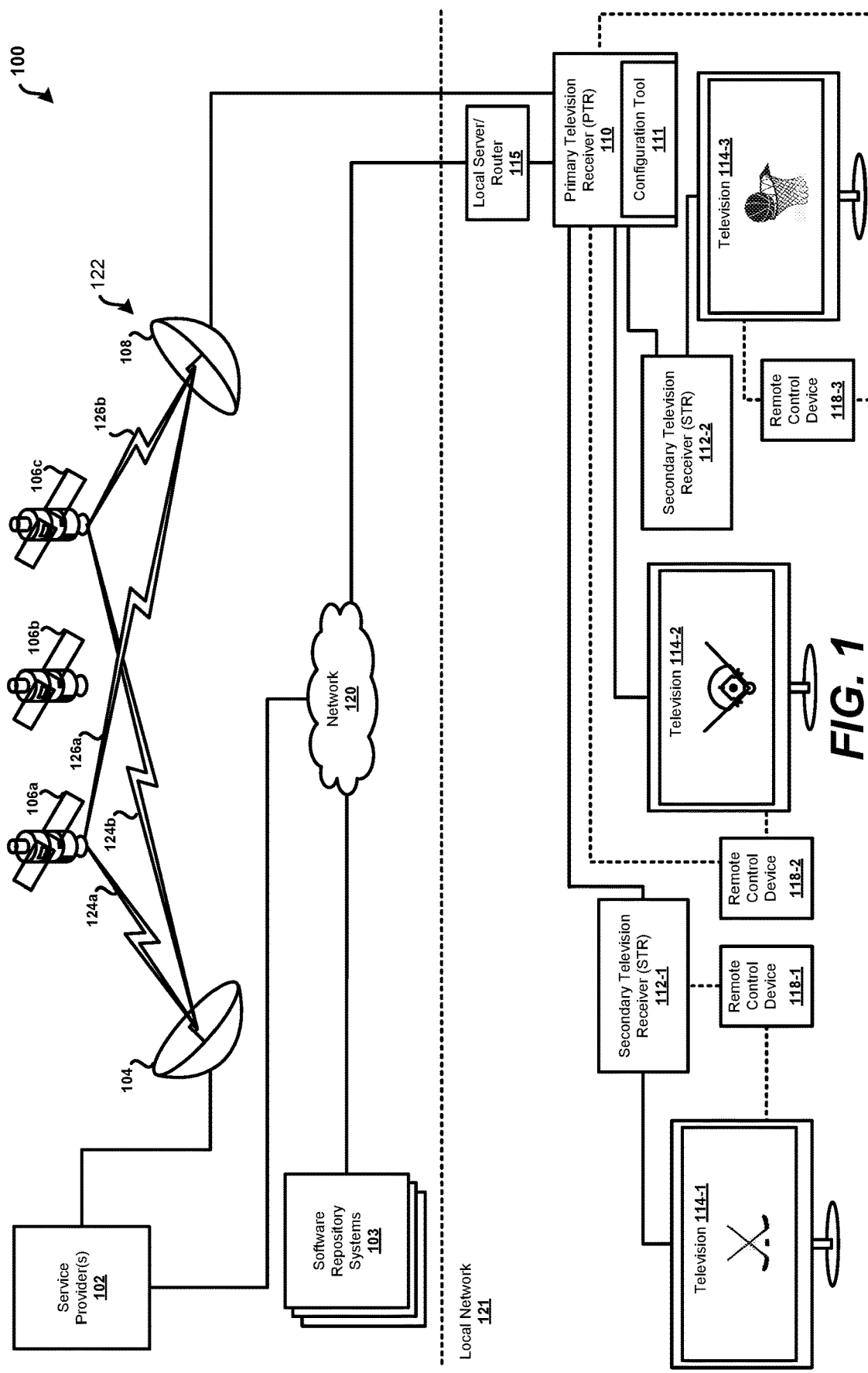
FIG. 1 illustrates an exemplary media content distribution system in accordance with embodiments according to the present disclosure.

FIG. 1 shows an exemplary media content distribution system 100 in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The system 100 may include a service provider 102, a satellite network 122 (which may include a satellite uplink 104, a plurality of satellites 106a-c, a satellite dish 108, etc.), a primary television receiver (PTR) 110, a plurality of secondary television receivers (STRs) 112, a plurality of televisions 114, remote control devices 118, a local server 115 (e.g., a home router) and at least one software repository system 103. As disclosed herein, the PTR 110 and STRs 112 may correspond to smart TV content receivers. The televisions 114 may correspond to smart TVs.

The system 100 may also include at least one network 120 that may facilitate bi-directional communications for data transfer between the PTR 110, the service provider 102, and the software repository system 103, which communications may be by way of the local server 115 and/or the satellite components. The network 120 is intended to represent any number of terrestrial and/or non-terrestrial network features or elements. For example, the network 120 may incorporate or exhibit any number of features or elements of various wireless and/or hardwired packet-based communication networks such as, for example, a wide area network (WAN), a home area network (HAN), a local area network (LAN), a wireless-local area network (W-LAN), Internet, a cellular network, or any other type of communication network configured such that data may be transferred between and among respective elements of the system 100.

The system 100 may also include at least one local network 121 that establishes a bi-directional communication path for data transfer between and among the PTR 110, STRs 112, and televisions 114 of the system 100, which may be by way of the local server 115. The local network 121 may correspond to a home computing environment. The PTR 110, together with the STRs 112 and televisions 114, may each be incorporated within or form at least a portion of a particular home computing network 121.

The PTR 110 and the STRs 112 as described throughout may correspond to television receivers, television converters, etc., such as a set-top box (STB) for example, configured as smart TV content receivers. In another example, the PTR 110 and the STRs 112, may exhibit functionality integrated as part of or into a television, a digital video recorder (DVR), a computer such as a tablet computing device, or any other computing system or device, as well as variations thereof. Further, the PTR 110 may be configured so as to enable communications in accordance with any particular communication protocol(s) and/or standard(s) including, for example, transmission control protocol (TCP)/Internet protocol (IP), digital living network alliance/digital transmission copy protection over Internet Protocol), high-definition multimedia interface/high-bandwidth digital content protection, etc. For instance, one or more of the various elements or components of the local network 121 may be configured to communicate in accordance with the MoCA® (Multimedia over Coax Alliance) home entertainment networking standard.

In some embodiments, the PTR 110 may include, have installed thereon, be connected to, or otherwise be communicatively coupled to a PTR configuration tool 111. The PTR configuration tool 111 may adapt (e.g., with low-level software and, in some embodiments, hardware) the PTR 110 currently deployed in a home computing environment to operate in accordance with various embodiments disclosed herein. In some embodiments, the PTR configuration tool 111 may correspond to an add-on device that configures the PTR 110 with the software components, and in some embodiments provides the necessary hardware components, to enable the PTR 110 to provide, among other things, the control and networking features to the local network 121, obtain over-the-top (OTT) services and stream to STRs 112, communicate with STRs 112, operate as a server in the client-server architecture to provide the various features to the STRs 112, utilize link-local IP addresses to provide the various features, obtain and provide the software update features to the STRs 112, and/or the like features disclosed herein.

In some embodiments, the PTR configuration tool 111 may correspond to a dongle that may be connected to a port of the PTR 110. For example, the PTR configuration tool 111 may be connected by way of a USB connection, USB-C connection, SD card connection, Bluetooth connection, NFC connection, and/or the like of the PTR 110. Accordingly, the PTR configuration tool 111 may allow for quick adaptation of a PTR 110 without the need for individualized integration, for example, without individualized Linux integration. It is appreciated that the description of the PTRs 111 provided above is in no way limiting the scope of the present disclosure. Rather, other embodiments are possible, where pre-configured PTRs 110 may be initially configured with low-level software and hardware to perform the functionalities disclosed herein.

In practice, the satellites 106*a-c* may each be configured to receive uplink signals (e.g., 124*a*, 124*b*, etc.) from the satellite uplink 104. In this example, each of the uplink signals may contain one or more transponder streams of particular data or content, such as one or more particular television channels, as supplied by the service provider 102. For example, each of the respective uplink signals may contain various media content such as encoded High-Definition television channels, Standard Definition television channels, on-demand programming, programming information, and/or any other content in the form of at least one transponder stream, and in accordance with an allotted carrier frequency and bandwidth. In this example, different media content may be carried using different ones of the satellites 106*a-c*.

The satellites 106*a-c* may further be configured to relay the uplink signals (i.e., 124*a*, 124*b*) to the satellite dish 108 as downlink signals (represented as 126*a*, 126*b*). Similar to the uplink signals, each of the downlink signals may contain one or more transponder streams of particular data or content, such as various encoded and/or at least partially electronically scrambled television channels, on-demand programming, etc., in accordance with an allotted carrier frequency and bandwidth. The downlink signals, however, may not necessarily contain the same or similar content as a corresponding one of the uplink signals. This may occur due to different user subscriptions. For example, the uplink signal 124*a* may include a first transponder stream containing at least a first group or grouping of television channels, and the downlink signal 126*a* may include a second transponder stream containing at least a second, different group or grouping of television channels. In other examples, the first and second group of television channels may have one or more television channels in common. In other words, there may be varying degrees of correlation between the uplink signals and the downlink signals, both in terms of content and underlying characteristics. Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers (e.g., HBO®, CBS®, ESPN®, etc.).

The satellite dish 108 may be provided for use to receive television channels (e.g., on a subscription basis) provided by the service provider 102, satellite uplink 104, and/or satellites 106*a-c*. For example, the satellite dish 108 may be configured to receive particular transponder streams, or downlink signals e.g., 126*a* or 126*b*, from one or more of the satellites 106*a-c*. Additionally, the PTR 110, which is communicatively coupled to the satellite dish 108, may subsequently select via tuner, decode, and relay particular transponder streams to a television 114-2 for display thereon. For example, the satellite dish 108 and the PTR 110 may, respectively, be configured to receive, decode, and relay at least one premium HD-formatted television channel to the television 114-2. Programming or content associated with the HD channel may generally be presented live, or from a recording as previously stored on, by, or at the PTR 110. Here, the HD channel may be output to the television 114-1 in accordance with the HDMI/HDCP content protection technologies. Other embodiments are however possible. For example, the HD channel may be output to the television 114-1 in accordance with the MoCA® home entertainment networking standard.

Further, the PTR 110 may select via tuner, decode, and relay particular transponder streams to one or both of the STRs 112, which may in turn relay particular transponder streams to a corresponding one of the televisions 114 for display thereon. For example, the satellite dish 108 and the PTR 110 may, respectively, be configured to receive, decode, and relay at least one television channel to the television 114-1 by way of the STR 112-1. It is appreciated that the television channel may be presented live, or from a recording as previously stored on the PTR 110, and may be output to the television 114-1 by way of the STR 112-1 in accordance with a particular content protection technology and/or networking standard.

According to some embodiments, the PTR 110 and the STRs 112 may be configured in a client-server architecture within the local network 121. Each STR 112 may operate and stream A/V content without communicating directly to a cloud server (e.g., without communicating to a remote system via the network 120). Each STR 112 may obtain the majority or all of its content from a PTR 110 with which the STR 112 is communicatively coupled (e.g., via one or a combination of MoCA, Wi-Fi, and/or the like) in the local computing network 121. In some examples, each STR 112 may obtain over the air (OTA) updates and smart TV OS-specific file format packages from the PTR 110.

Remote control devices 118 may be an electronic device such as a TV remote or a universal remote configured to receive an input from a user of the device and transmit a corresponding command to another device in system 100. Additionally or alternatively, remote control devices 118 may include software implementations of more traditional remote functionalities. For example, remote control devices 118 may be mobile device tablet computers, laptop computers, etc., executing a software application configured to receive inputs from a user corresponding to the inputs on a traditional remote and transmit corresponding commands to one of multiple intended devices in system 100.

Remote control devices 118 may include speakers and/or microphones configured to enable bi-directional audio communication between remote control devices 118 and other devices in system 100. For example, remote control devices 118 may be configured to record audio, such as human speech, and transmit the recorded audio to one or more devices in system 100 for additional processing. In some embodiments, the audio recording is processed to identify one or more voice commands, as described further below. For example, a user may use their voice to change a channel, adjust the volume, and/or interact with a voice assistant by speaking into one of remote control devices 118. In some embodiments, the audio recording is transmitted to a voice command server system (which may correspond to a service provider system 102 in some embodiments) for translation and interpretation. For example, the PTR 110 may transmit a pre-processed version of the audio recording to the voice command server system via network 120, at which point the voice command server system may translate the audio recording into text and interpret the text in order to determine an appropriate response. The voice command server system may then transmit the appropriate response, such as a device command or an informational response, back to the PTR 110 for additional action.

The remote control devices 118 may be configured to communicate with any one or more devices in the system 100. For example, the remote control device 118-2 and 118-3 may each be in communication with the television 114-2 and the television 114-3, respectively, in addition to the PTR 110. As another example, the remote control device 118-1 may only be in communication with television 114-1 and STR 112-1. Configuring the remote control devices 118 to be in communication with multiple different devices may allow for optimized communication of commands intended for specific devices. For example, the remote control device 118-1 may be configured to transmit volume related commands directly to the television 114-1 while transmitting channel related commands directly to the STR 112-1. It should be understood that any of the remote control devices 118 may send any combination or type of command to any combination of other devices in system 100. For example, the remote control device 118-1 may transmit volume related commands to the PTR 110, which may then be relayed to the television 114-1 in order to take effect.

The remote control devices 118 may use any one or a combination of communication methods to transmit commands to other devices of system 100. For example, the remote control devices 118 may use a line-of-sight communication method, such as infrared technology, to communicate with one or more devices in system 100, such as the televisions 114. As another example, the remote control devices 118 may use a radio frequency communication method, such as ZigBee® RF4CE or Bluetooth®, to communicate with one or more other devices in the system 100, such as the PTR 110 and/or the STRs 112. In some embodiments, the remote control devices 118 may communicate over the local network 121. For example, the remote control device 118-1 may be an application executing on a mobile device configured to use TCP/IP protocols to communicate with other devices on the local network 121.

Figure 2:
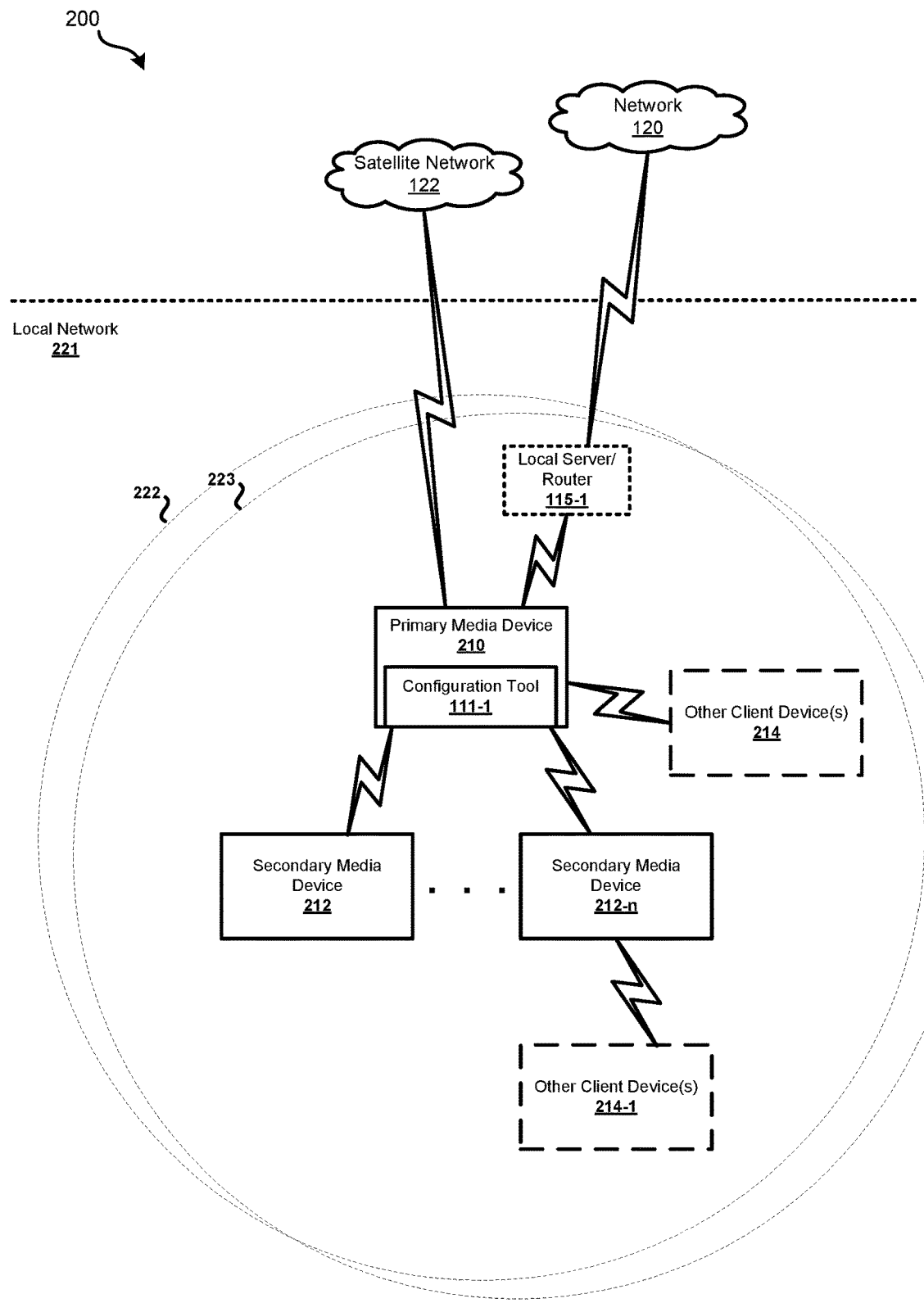
FIG. 2 illustrates an example block diagram of a client-server A/V streaming architecture over a local network with a primary media device configured with the configuration tool, in accordance with embodiments according to the present disclosure.

FIG. 2 illustrates an example block diagram of a client-server A/V streaming architecture 200 over a local network 221 with a primary media device 210 configured with the configuration tool 111-1, in accordance with disclosed embodiments according to the present disclosure. The general environment of the client-server A/V streaming architecture 200 may correspond to client-server A/V streaming over the local network 221, where the local network 221 may, for example, correspond to a home network 121. The local network 221 may include a primary media device 210 and one or more secondary media devices 212.

In some embodiments, the primary media device 210 may include the PTR 110 and each secondary media device 212 may include the STR 112; however, in some embodiments, the primary media device 210 and the one or more secondary media devices 212 may include other types of content receivers. In some embodiments, the primary media device 210 and the one or more secondary media devices 212 may include one or a combination of various computerized devices configured to facilitate features disclosed in various embodiments herein. For example, in various embodiments, the primary media device 210 and the one or more secondary media devices 212 may include one or more of a laptop computer, a desktop computer, a home server, a home router, a smart TV, a smartphone, a tablet computer, another mobile device, smart glasses, a smart watch, another form of wearable computing device, and/or the like. In some embodiments, the primary media device 210 and the one or more secondary media devices 212 may serve content to and/or include one or more display devices, such as a televisions 114 and/or integrated display devices. In some embodiments, the primary media device 210 and/or the one or more secondary media devices 212 may serve one or more other client devices 214, which may, for example, include one or a combination of the televisions 114 and/or the other abovementioned devices.

In a conventional client-server architecture, devices of a local network may need to connect to the Internet for enhanced functionality through a home router. To connect with the router, the devices may get an IP address from the home router. However, there are issues with such a situation that are resolved by embodiments disclosed herein. For example, there may be no Internet connection for any of a number of different reasons. However, a secondary media device 212 video streaming encrypted A/V from a primary media deice 210 may need to be supported even when there is no Internet connection. An IP address may be still needed.

Disclosed embodiments may provide solutions for such issues that include providing for an IP address that may be a link-local IP address (also known as zero-conf or zero-configuration networking). As disclosed herein, the devices of the client-server A/V streaming architecture 200 may be configured to communicate with each other and perform video streaming using link-local IP addresses, which, because they are self-assigned, provide for more stable AV streaming.

Another issue that is solved by disclosed embodiments involves IP addresses that change or are lost. With a router connection to the Internet, there is a DHCP (Dynamic Host Configuration Protocol) Server which assigns routable IP address, called a DHCP address. DHCP Server assigns IP addresses to individual hosts in the network upon host request. However, the IP addresses may change and may be lost from the perspective of the individual devices, especially with some problematic DHCP servers running in the hundreds of different router models. Disclosed embodiments may also provide solutions for such issues, as disclosed herein.

Other issues that are resolved by disclosed embodiments include the following. The IP addresses supported by some routers in some home networks can be limited such that they are insufficient to support all the devices on the network. Also, routers can enter a bad state such that cannot adequately provide for A/V streaming via IP. Additionally, conventional smart TV and associated apps do not support solutions where no Wi-Fi is available; conventional designs assume Wi-Fi is available. However, disclosed embodiments may provide solid, reliable A/V services to the primary media devices 210 and the secondary media devices 212, despite the above problems.

The client-server A/V streaming architecture 200 may correspond to a multiple-subnet architecture. In the local network 221, the primary media device 210 and/or the one or more secondary media devices 212 may be configured to establish and use multiple subnets 222 and 223 over the same physical network connection(s). As disclosed herein, in some embodiments, the primary media device 210 may be configured to perform its operations as further detailed herein by way of the configuration tool 111-1. A dual-subnet architecture 200 may, for example, include a link-local IP subnet (also known as, zero-configuration) 222 and a Dynamic Host Configuration Protocol (DHCP) IP subnet 223. Typically, DHCP IP addressing may be mainly used for Internet access and for communication with other home network devices. DHCP IP addressing may be available when the local network 221 includes a DHCP server 115-1 (e.g., a home router 115-1). Each device may obtain its own DHCP IP address from the DHCP server 115-1. In some embodiments, the secondary media device 212 and/or other client device 214 may object their respective DHCP IP addresses from the DHCP server 115-1 through the primary media device 210; in some embodiments, the secondary media device 212 and/or other client device 214 may object their respective DHCP IP addresses directly from the DHCP server 115-1.

In the local network 221, in addition to creating, establishing, expanding, and/or using the DHCP IP subnet 223, the primary media device 210 and/or the one or more secondary media devices 212 may further create and use the link-local IP subnet 222. Within a typical home network, it may be that not all devices support both subnets. A DHCP IP subnet may be supported but not necessarily both a DHCP IP subnet and a link-local IP subnet. However, the primary media devices 210 and the secondary media devices 212 may support multiple subnets, including both a DHCP IP subnet 223 and a link-local IP subnet 222.

The primary media device 210 and/or the one or more secondary media devices 212 may self-assign link-local IP addresses to create the subnet 222. The primary media device 210 and the one or more secondary media devices 212 may each self-assign link-local IP addresses upon startup, and/or after network connection interruption and subsequent reestablishment. In some instances, other devices 214 in the local network 221, which may include third-party devices, may also generate their own link-local IP addresses. The architecture 200 may support multiple platforms, including Linux, Android, and/or the like. The devices 210, 212, and/or 214 may be configured to communicate with each other and perform video streaming using link-local IP addresses, which, because they are self-assigned, provide for more stable A/V streaming. The primary media device 210 and/or the one or more secondary media devices 212 may, for example, use the link-local IP subnet architecture 200 for A/V streaming, command and control, and other client-service device communications as a default.

Figure 3:
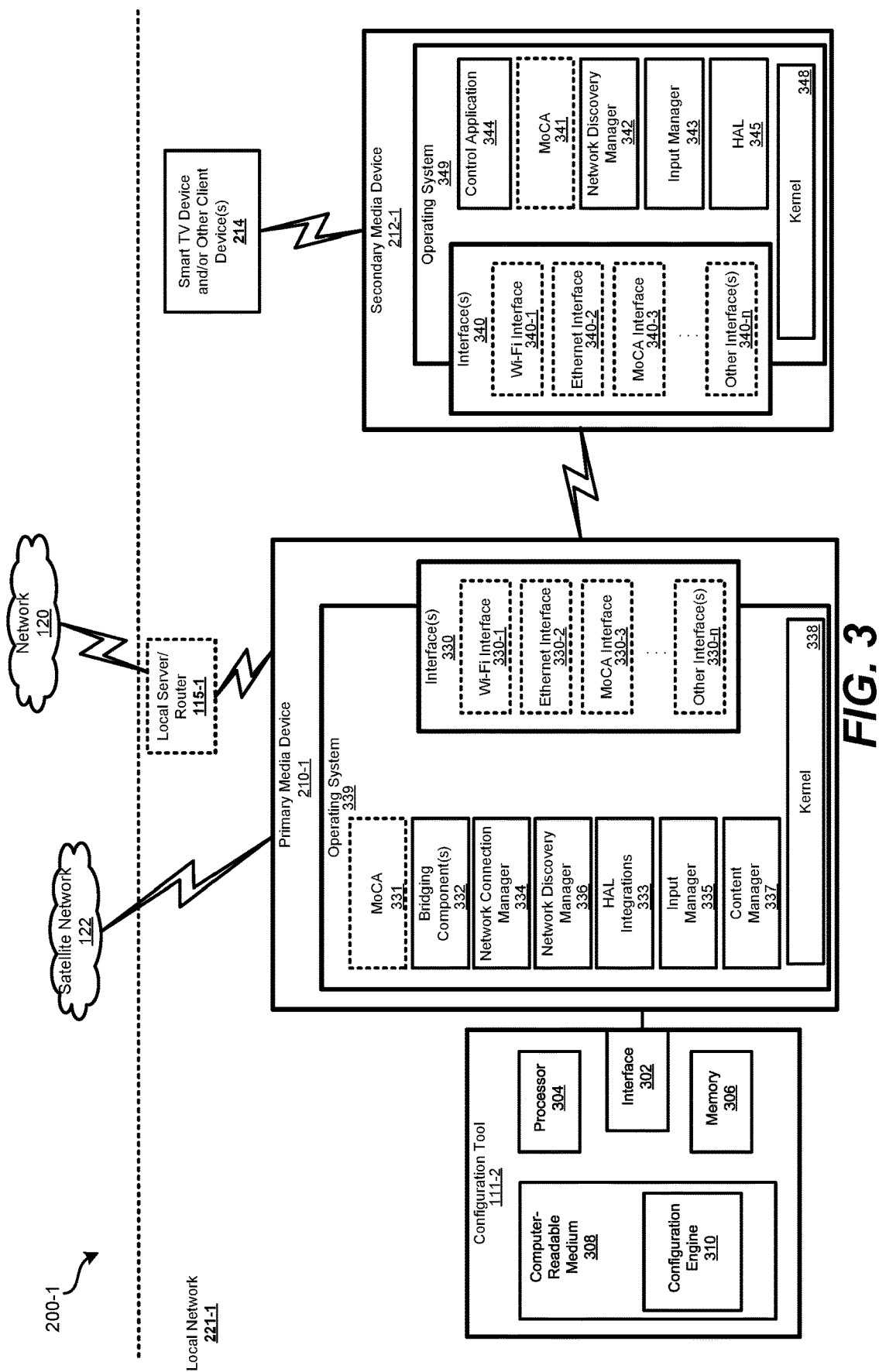
FIG. 3 further illustrates an example block diagram of a primary media device configured with the configuration tool and a secondary media device in the client-server A/V streaming architecture, in accordance with embodiments according to the present disclosure.

FIG. 3 illustrates an example block diagram of a primary media device 210-1 configured with the configuration tool 111-2 and a secondary media device 212-1 in the client-server A/V streaming architecture 200, in accordance with disclosed embodiments according to the present disclosure. For brevity, the primary media device 210-1, the configuration tool 111-2, and the secondary media device 212-1 are depicted in a simplified form, and various embodiments of the primary media device 210-1, the configuration tool 111-2, and the secondary media device 212-1 may generally include more and/or different components to implementing various features of the embodiments.

The network 120 may provide a connection between service providers 102 and the primary media device 210-1. Additionally or alternatively, the primary media device 210-1 may be connected to service providers 102 via a satellite connection. For example, as described above, the primary media device 210-1 may be coupled with a satellite antenna configured to receive data from one or more satellites. The service providers 102 may include one or more remote services configured to provide digital content such as live television channels, subscription television shows, streaming movies, streaming audio, shopping, etc. to a requesting device, such as the primary media device 210-1. The service providers 102 may distribute digital content via network 120, such as the Internet. Additionally, or alternatively, service providers 102 may distribute digital content via direct broadcast satellite services.

In some embodiments, the primary media device 210-1 may be part of multiple different networks. For example, the primary media device 210-1 may communicate with service providers 102 via the Internet. Additionally or alternatively, the primary media device 210-1 may communicate with the secondary media device 212-1 via the local network 121, 221. In some embodiments, the primary media device 210-1 has a direct connection to network 120 while the secondary media device 212-1 does not have a direct connection to network 120. For example, the secondary media device 212-1 may route some or all communication to network 120 via the primary media device 210-1. Incoming communication from network 120 may also be received by the primary media device 210-1 and routed to the secondary media device 212-1. In this way, the secondary media device 212-1 may still receive and consume services from service providers 102 without having a direct connection with network 120. This may include the primary media device 210-1 and the secondary media device 212-1 providing the ability to play encrypted A/V without an Internet connection on an Android TV.

The configuration tool 111-2 may be a portable device suitable for easy installation with respect to the primary media device 210-1 as an add-on device that transforms the primary media device 210-1 to operate in accordance with various embodiments disclosed herein. In some embodiments, the configuration tool 111-2 may correspond to a dongle that may be connected to a port of the primary media device 210-1. The configuration tool 111-2 may include one or more communication modules and interfaces 302 configured for interface with the primary media device 210-1. The communication modules and interfaces 302 may include one or combination of a USB interface, a USB-C interface, an SD card interface, and/or the like. Additionally or alternatively, the communication modules and interfaces 302 may include one or combination of ZigBee, Bluetooth, Z-Wave, Wi-Fi, and/or the like RF communication modules which allow the wireless communication of proximate devices.

The configuration tool 111-2 may include memory 306 communicatively coupled to one or more processors 304 (e.g., a microprocessor) for processing the functions of the configuration tool 111-2. The configuration tool 111-2 may at least one processor-readable/computer-readable medium 308 coupled to the processor 304, which stores executable code, plug-ins, application programs, and/or other computer code instructions for operating the configuration tool 111-2 and using the configuration tool 111-2 to adapt (e.g., with low-level software and, in some embodiments, hardware) the primary media device 210-1 to operate in accordance with various embodiments disclosed herein. The configuration tool 111-2 may include a configuration engine 310 that may be configured to configure the primary media device 210-1. In various embodiments, the configuration engine 310 may be stored in the computer-readable media 308 and/or the memory 306.

When the configuration tool 111-2 is connected to the primary media device 210-1 (e.g., via USB connection, wirelessly, etc.), the configuration tool 111-2 and the primary media device 210-1 may communicate with each other to facilitate low-level discovery of each other. In some embodiments, the primary media device 210-1 may at least partially utilize the discovery process disclosed further herein. For example, some embodiments of the primary media device 210-1 may utilize one or a combination of the features of a network connection manager 334, a network device manager 336, discovery protocols such as UPnP and DNS-SD Device Discovery, and/or the like to facilitate discovery of the configuration tool 111-2. Likewise, some embodiments of the configuration tool 111-2 may include and utilize one or combination of corresponding modules and features to facilitate discovery of the primary media device 210-1.

Once the configuration tool 111-2 and the primary media device 210-1 are discovered, identified, and known to each other, the configuration engine 310 may automatically execute configuration processes with respect to the primary media device 210-1 in some embodiments. The configuration engine 310 may correspond to any suitable executable code, plug-ins, application programs, and/or other software to execute to configure the primary media device 210-1, which may include installing executable code, plug-ins, modules, application programs, and/or other software on the primary media device 210-1. When the configuration tool 111-2 configures the primary media device 210-1, the configuration tool 111-2 may cause the primary media device 210-1 to automatically transition from its original mode of operations to a different mode of operations that facilitate the enhanced features and operations of embodiments disclosed herein. New settings may be created for the new mode of operations. A composite of the and new settings and at least a portion of the previous settings of the primary media device 210-1 may be saved and stored locally by the primary media device 210-1. Additionally, the composite of the settings may be communicated to a backend system (e.g., a service provider system 102) for backup, in order to allow restoration of the primary media device 210-1 with the composite of the settings if need be.

This may allow the primary media device 210-1 to provide, among other things, the client-server features to the local network 121, 221; operate as a server in the client-server architecture to provide the various features to the secondary media devices 212 and corresponding devices 214; utilize link-local IP addresses to provide the various features; extend the ability of the primary media device 210-1 with a content manager 337 to manage, and provide for connection ID management for, device-specific sessions for the secondary media devices 212-1 and new client devices 114, 214 it serves; and/or the like features disclosed herein. The configuration tool 111-2 may, for example, overtake one or more user interfaces of the primary media device 210-1 and extend the functionalities of the primary media device 210-1. This may allow a user who has a smart TV 114, 214 (e.g., an Android TV) communicatively coupled to the primary media device 210-1 directly or indirectly via a secondary media device 212-1 to be able to access all the features of the smart TV 114, 214 (e.g., playstore apps, etc.) and also be able to utilize the functionalities of provided by the primary media device 210-1.

As another example, the configuration of the primary media device 210-1 by way of the configuration tool 111-2 may further allow for hardware abstraction layer (HAL) integrations 333 that facilitate the primary media device 210-1 to integrate with voice commands of smart TV devices 114, 214 in the local network 121, 221. The HAL integrations 333 may correspond to low-level software integration to allow communication with Google or other smart TV OS voice commands. In some embodiments, for example, the HAL integrations 333 of the primary media device 210-1 and secondary media device 212-1 frameworks may be configured in conjunction with Zigbee RF4CE components to operate applications disclosed herein. For example, a network device manager (NDM) 342 of the secondary media device 212-1, which may be configured to discover the primary media devices 210-1 and secondary media devices 212-1 on the network through a network interface of the secondary media device 212-1, may use an audio HAL integration component.

As another example, an input manager 343 of the secondary media device 212-1, which may be configured to facilitate communication with the remote control 118, may use an audio HAL integration component 345. Likewise, the primary media device 210-1, by way of the configuration tool 111-2, may include an audio HAL integration component 333 to receive and process voice data at the primary media device 210-1 through an input manager 335 of the primary media device 210-1, inject the voice data or corresponding commands to the HAL and smart TV framework so it is available for the voice assistant of the smart TV device 114, 214 (e.g., Google assistant or the like). With the primary media device 210-1 configured with the configuration tool 111-2, the primary media device 210-1 may be able to reuse the same remote control 118 but with extended features such as voice commands which may be received via the remote control 118. Further details regarding the voice integration features facilitated by the configuration tool 111 are disclosed in U.S. patent application Ser. No. 17/556,695, filed Dec. 20, 2021, the entire contents of which are incorporated by reference as if fully set forth herein for all purposes.

With the primary media device 210 configured with the configuration tool 111, the client-server architecture 200 may allow for the primary media device 210-1 and the secondary media device 212-1 to provide a non-pure over-the-top solution, where encrypted A/V and other content may be provided with or without an Internet connection. The primary media device 210-1 may be configured to obtain encrypted A/V and other content via the network 120 (e.g., the Internet) and/or via the satellite network 122 (e.g., from the service provider systems 102).

With multiple client devices 114, 214 (e.g., Android TVs), content provided by the primary media device 210-1 (e.g., by way of one or more tuners of the device 210-1) may be shared simultaneously or substantially simultaneously with the multiple client devices 114, 214, directly from the primary media device 210-1 and/or via one or more secondary media devices 212-1. Accordingly, with some embodiments, upon user request with a control device, content from the primary media device 210-1 may be shared with the multiple client devices 114, 214 or a subset thereof.

Further, the shared content may be manipulated separately and independently (e.g., with playback control features such as pausing, skipping, transporting, rewinding, playback speed controls, recording, etc.) via the secondary media devices 212-1 and/or client devices 114, 214, while the shared content continues to stream to all the devices. In some embodiments, one or more tuners of the secondary media devices 212-1 may be allocated to the receive stream in order to facilitate the playback control features that may be unique to a particular secondary media device 212-1 according to the viewer control commands received by the particular secondary media device 212-1. Thus, the primary media device 210-1 and the secondary media devices 212-1 would allow for one viewer of shared content to pause playback at one secondary media device 212-1 and/or client device 114, 214, while another viewer of the shared content rewinds the shared content at another secondary media device 212-1 and/or client device 114, 214.

Additionally or alternatively, with multiple client devices 114, 214, one client device 114 may be served content via the Internet, while another client device 114 may be simultaneously served content via satellite. Moreover, even on one client device 114, a combination of content from different sources (e.g., obtain via Internet and satellite) may be provided by the primary media device 210-1 and/or the secondary media device 212-1. The client-server A/V devices 210-1 and/or 212-1 may automatically select whether to obtain encrypted A/V and other content via the network 120 and/or via the satellite network 122 based at least in part on content type and/or network routing reachability/availability. Accordingly, the primary media device 210-1 and the secondary media device 212-1 may provide for dynamic switching between the network 120 and/or via the satellite network 122.

In addition to streaming encrypted A/V content from the primary media device 210-1, the secondary media device 212-1 in accordance with disclosed embodiments may be configured to provide one or more smart TV functionalities, such as access to one or more applications, voice assistants, games, and/or other digital content. The smart TV functionalities may be included, and/or accessible through, the operating system 349 installed on the secondary media device 212-1. The operating system 349 may provide a set of processes and a particular inter process communication (IPC) mechanism that enables the processes to communicate and interact with each other.

However, integrating the set of software applications and/or processes configured to obtain the A/V content from the primary media device 210-1 with the smart TV operating system may pose several unique challenges. First, the IPC mechanism provided by the smart TV operating system may not be the same IPC mechanism used by the set of applications configured to obtain the A/V content from the primary television receiver. Further, the smart TV operating system may not include one or more libraries that support the IPC mechanism used by the set of applications. Lastly, the smart TV operating system may not include one or more drivers configured to support the communication between the secondary media device 212-1 and the primary media device 210-1 by which the A/V content is obtained.

Embodiments detailed herein can deal with these challenges and others. A custom software stack within the smart TV operating system can be configured to execute in parallel with the native software stack provided by the smart TV operating system. Existing sets of software applications configured to obtain the A/V content from primary television receivers may then be installed in the custom software stack. The modifications may enable the software applications in the custom software stack to interact with processes in the native stack while maintaining their original functionality and portability across multiple platforms. Installing a parallel software stack may reduce the complexity of developing new software applications for the smart TV operating system in addition to creating an environment where other functionalities may be quickly and easily integrated.

The primary media device 210-1 and the secondary media device 212-1 may include operating systems 339, 349 and kernels 338, 348, and may conform to various configurations in accordance with various embodiments. The primary media device 210-1 may include the operating system 339 configured to execute one or more processes. The one or more processes may configure the primary media device 210-1 to receive digital content from service providers 102 and provide the digital content to the secondary media device 212-1 in response to a request received by the primary media device 210-1 from the secondary media device 212-1. For example, the secondary media device 212-1 may be configured to transmit a request to the primary media device 210-1 to tune one or more television frequency tuners of the primary media device 210-1 to a specific frequency associated with a television channel and stream the content received at the specific frequency back to the secondary media device 212-1. The operating system 339 may include one or more drivers configured to control hardware and/or software-based television frequency tuners on-board the primary media device 210-1 and configured to tune to one of a plurality of frequencies corresponding to a plurality of television channels. Additionally, or alternatively, the operating system 339 may include drivers configured to control one or more functions of external devices, such as a satellite antenna, to which the primary media device 210-1 is connected. In some embodiments, the operating system 339 may be a Linux-based operating system that configures the primary media device 210-1 to function as a smart TV content receiver and provider. As another example, the secondary media device 212-1 may be configured to transmit a request to the primary media device 210-1 to provide digital content previously recorded and/or stored by the primary media device 210-1 to the secondary media device 212-1.

The secondary media device 212-1 may include the operating system 349, which may include one or more components configured to manage various hardware and software resource of the secondary media device 212-1. For example, the operating system 349 may include one or more drivers configured to display digital content on a television screen communicatively coupled with the secondary media device 212-1, such as television 114 as described above. In some embodiments, the operating system 349 may be different from the operating system 339 included in the primary media device 210-1. For example, while the primary media device 210-1 may be configured to operate using a Linux-based operating system, the operating system 349 may be a Linux-based operating system that configures the secondary media device 212-1 to function as an Android TV content receiver device.

The kernel 348 may include one or more services at the core of operating system 210. For example, the kernel 348 may facilitate interactions between hardware and software components of the secondary media device 212-1. The kernel 348 may control various hardware resources, such as input and output (I/O) devices, memory, peripherals etc. via device drivers, and optimize utilization of common resources such as a central processing unit (CPU), cache memory, file systems, and network sockets. One or more software stacks can be installed on the kernel 348. For example, a native software stack and a custom software stack may each be installed on the kernel 348. The native software stack may include a default software stack for the operating system 349. The custom software stack may be a separate software stack loaded onto the operating system 349. In some embodiments, one or more components of the custom software stack are loaded onto operating system 349 using a custom loader. Further details regarding these embodiments are provided in U.S. patent application Ser. No. 17/556,723, filed Dec. 20, 2021, the entire contents of which are incorporated by reference as if fully set forth herein for all purposes.

In some embodiments, the secondary media device 212-1 and the primary media device 210-1 may be communicatively coupled using one or more coaxial cables. For example, the secondary media device 212-1 and the primary media device 210-1 may include physical connections configured to receive a coaxial cable. Once coupled using coaxial cable, the secondary media device 212-1 and the primary media device 210-1 may utilize the MoCA standards for bi-directional communications between the secondary media device 212-1 and the primary media device 210-1.

In various embodiments, the primary media device 210-1 may include one or more interfaces 330. The one or more interfaces 330 may include a Wi-Fi interface 330-1, an Ethernet interface 330-2, a MoCA interface 330-3, and/or one or more other interfaces. In various embodiments, the secondary media device 212-1 may likewise include one or more interfaces 340. The one or more interfaces 340 may include a Wi-Fi interface 340-1, an Ethernet interface 340-2, a MoCA interface 340-3, and/or one or more other interfaces. Accordingly, the different types of connections may include one or a combination of Wi-Fi connections, Ethernet connections, MoCA connections, USB connections, and/or the like.

In some embodiments, the MoCA interfaces 330-3, 340-3 may correspond to MoCA components 331, 341 that include hardware and software configured to provide non-OTT solutions that enable encrypted content streaming without an Internet connection. The MoCA components 331, 341, for example, may correspond to MoCA applications and interfaces that allow communication of digital packets over a coaxial cable connection between the primary media device 210-1 and the secondary media device 212-1. For instance with respect to the secondary media device 212-1, the MoCA components 341 may include a MoCA driver that may operate like a device driver to allow use of a MoCA connection to communicate with the primary media device 210-1. A control application 344 or another system application of the secondary media device 212-1 may initiate a MoCA that operates with the kernel 348 to set up the interface. To a smart TV device 214, the interface may appear as a simple network interface, without detecting that the interface media is different. Accordingly, MoCA connection quality and consistency may be achieved. Additionally or alternatively, some embodiments may be configured with Wi-Fi radios and software corresponding to the Wi-Fi interfaces 330-1, 340-1 to facilitate a Wi-Fi connection for communications bandwidth the primary media device 210-1 and the secondary media device 212-1. The primary media device 210-1 and the secondary media device 212-1 may be adaptive to utilize one or both of the MoCA connection and the Wi-Fi connection as function of operating conditions in order to maintain encrypted A/V quality above a particular quality threshold without an Internet connection.

To facilitate the concurrent multiple-address configuration utilizing multiple subnets, each active network interface may be assigned IP addresses to provide for coexistent link-local IP addresses and DHCP IP addresses. For example, for each active network interface of the primary media device 210 and/or the one or more secondary media devices 212, a respective link-local IP address may be self-assigned by the respective device 210 or 212 alongside with the DHCP IP address so that each active interface has a link-local IP address and a DHCP IP address in parallel. By way of example, with a MoCA-enabled secondary media device 212-1, link-local IP addresses may be assigned for the MoCA interface 340-3 and the Ethernet interface 340-2. With a Wi-Fi-enabled secondary media device 212-1, link-local IP addresses may be assigned for the Wi-Fi interface 340-1 and the Ethernet interface 340-2. With some configurations of the primary media device 210-1 that utilize the PTR configuration tool 111, there may be a single interface for which a link-local IP address is assigned. Other embodiments are possible.

The primary media device 210-1 may include one or more bridging components 332. The bridging components 332 may correspond to level 2 and/or level 3 bridging components 332. The bridging components 332 may allow for provisioning of an Internet connection, for example, to a smart TV through the primary media device 210-1.

The configured primary media device 210-1 may include a network connection manager 334. In various embodiments, the secondary media device 212-1 may or may not also a network connection manager. The network connection manager 334 may bring up and activates all network interfaces, may detects when an interface is ready for communication (e.g., the low level is active), and may then starts an auto IP thread to obtain a link-local IP address. When a link-local IP address is ready to use, the network connection manager 334 may send a notification to a network device manager 336 to start discovery of other nodes in the network 221-1 on the interface.

The configured primary media device 210-1 may include a network device manager 336. In some embodiments, the secondary media device 212-1 may also include a network device manager 342. The network device managers 336, 342 may be configured to use a discovery protocol to discover the devices 210, 212, and/or 214 on the network 221 through the network interfaces 330, 340. The network discovery customization and network device manager communications may provide for how the client-server devices communicate to allow discovery of each other and to identify each other's IP addresses. The configured primary media device 210-1 and the secondary media device 212-1 may discover neighboring devices over both subnets 222, 223 concurrently. As long as a device is reachable via one subnet 222 or 223, it may be discovered. Devices may discover each other via both subnets 222, 223. The device discovery may be deployed through various protocols, such as UPnP and DNS-SD Device Discovery, for example.

The network connection manager 334 may detect on which interface a secondary media device 212-1 is detected (e.g., Wi-Fi interface 340-1, Ethernet interface 340-2, or MoCA interface 340-3). The primary media device 210-1 may authenticate content for streaming to the secondary media device 212-1. Before the secondary media device 212-1 starts using the primary media device 210-1, the primary media device 210-1 may check if the secondary media device 212-1 is authorized on an account associated with the primary media device 210-1 based at least in part on stored account information and/or communications with the service provider system 102.

The network connection manager 334 may set appropriate route rules and advanced route tables to properly route data to corresponding clients. This allows the use of the link-local subnet 222 to support mixed clients (e.g., MoCA-configured secondary media devices 212-1 and Wi-Fi-configured secondary media devices 212-1) in the same local network 221-1 (e.g., a household network).

Once devices are discovered and known to each other, the primary media device 210-1 and/or the secondary media device 212-1 may select the preferred subnet for communication automatically based at least in part on content type and/or network routing reachability. Link-local IP may be selected as preferred if devices discover each other via both subnets 222, 223. For example, client-Server A/V devices 210-1 and/or 212-1 may select the link-local subnet 222 for A/V streaming. The client-server A/V devices 210-1 and/or 212-1 may automatically switch to DHCP IP for A/V streaming when link-local IP is detected as not available, for example, due to third-party rogue network devices 114 and/or 115-1. The DHCP IP subnet 223 may be used to communicate with an Internet server. Accordingly, the primary media device 210-1 and the secondary media device 212-1 may provide for dynamic switching between link-local and DHCP.

However, link-local IP addressing and the link-local subnet 223 may be available at least with respect to the primary media device 210-1 and the secondary media device 212-1 even when no DHCP server 115-1 or home router 115-1 is available, so that client-server A/V streaming can always work. For example, the primary media device 210-1 may stream content, which it has stored, to the secondary media device 212-1. Additionally or alternatively, the primary media device 210-1 may obtain content via the satellite network 122, which content the primary media device 210-1 may then stream to the secondary media device 212-1. Accordingly, the primary media device 210-1 and the secondary media device 212-1 may provide for non-pure OTA (over-the-air) A/V streaming devices for smart TVs that may be integrated with such devices and/or may be communicatively coupled thereto (e.g., as other client devices 214, which may correspond to televisions 114 in some embodiments).

As disclosed herein, the devices 210-1, 212-1 may primarily use link-local IP addressing and a link-local subnet 223 to stream A/V, not DHCP IP. Link-local may be more stable than DHCP. This may guarantee A/V stream quality without disturbance when DHCP IP is not available or fluctuates (e.g., disconnections, the home router 115-1 may enter a bad state, may be old, etc.). The secondary media device 212-1 may always be able to find a primary media device 210-1 on the network 221-1 using the link-local subnet 223. If, for some reason (say, there is a problem on reboot, or some routers 115-1 may be limited such that they do not have enough DHCP addresses to support all the devices to which it should be connected on the local network, or some routers transition to a bad state after running for an extended period of time) the router 115-1 cannot assign a DHCP address, the link-local may be available. Only if link-local communications cannot be established, the DHCP IP address may be used as a fallback for A/V streaming.

Not all conventional client devices 214, associated apps, and routers 115-1 may support the dual-subnet architecture in accordance with disclosed embodiments. For example, some smart TVs may always use a single DHCP IP address on an interface. Problems can also occur when smart TVs, routers, or other home network devices do not follow an IP address conflict resolution protocol. To solve such problems, the primary media device 210-1 and/or the secondary media device 212-1 may identify when smart TVs, routers, or other home network devices do not follow an IP address conflict resolution protocol.

The primary media device 210-1 and/or the secondary media device 212-1 may be configured to work with third-party rogue network devices 214 and/or routers 115-1 that break link-local IP compatibility. For example, the primary media device 210-1 and/or the secondary media device 212-1 may be configured with an automatic troubleshooting mechanism that allows the primary media device 210-1 and/or the secondary to adapt solve situations where the devices 214 do not follow IP address conflict resolution protocol and dual IP addresses on single interface. The secondary media device 212-1 may adapt and reconfigure itself to avoid the problems.

When the primary media device 210-1 or the secondary media device 212-1 self-assigns a link-local IP address (e.g., as per RFC-3927 or RFC-8200), the device announces the link-local IP address to other devices with which it is in communication on the network 221-1. A rogue device 214 or 115-1 may object to the announced link-local IP address (e.g., objecting that it is a duplicate address). In such case where there is a conflict (e.g., because of alleged duplicate addresses on the network), the device 210-1 or 212-1 may follow a conflict resolution protocol for self-assigned link local IP addresses (e.g., per RFC 3927). The device 210-1 or 212-1 may detect and store the MAC address of the rogue device. The device 210-1 or 212-1 may change its self-assigned link-local IP address, generating a new address and announcing to the rogue device.

If the rogue device continues to object, the device 210-1 or 212-1 may change its self-assigned link-local IP address and announce the new address to the rogue device. If the rogue device (which is identified by the device MAC address) again objects, the device 210-1 or 212-1 may the pattern of behavior of the rogue device and, after X attempts (e.g., three attempts) of changing self-assigned link-local IP addresses, if a rogue device continues to object (which corresponds to claiming that various different link-local IP addresses as its own), the device 210-1 or 212-1 may determine that the rogue device is a compatibility issue with the link-local addressing scheme. In response, the device 210-1 or 212-1 may overrule the objections, and keep and use the last-generated address.

In some instances, when a rogue device obtains a DHCP IP address on an interface, the device 214 may remove the link-local IP address. However, the network connection manager 334 may detect that and may add the link-local IP address back. Accordingly, the network connection manager 334 may solve some such problems where a client device 214 attempts to utilize a DHCP IP address as the primary address instead of utilizing the link-local address is the primary address in accordance with disclosed embodiments.

Accordingly, the primary media device 210-1 and the secondary media device 212-1 may be configured with a link-local architecture to facilitate zero-configuration networking so that the primary media device 210-1 and the secondary media device 212-1 may communicate directly, rather than relying on an Internet connection such as network 120. By using the link-local IP subnet 222, disclosed embodiments may not require the existence of a router or an Internet connection in order for the primary media device 210-1 and the secondary media device 212-1 to communicate and operate to facilitate content streaming with reliable consumer-grade A/V services. The primary media device 210-1 and the secondary media device 212-1 may utilize the link-local IP address as a default as part of the processes to provide for A/V stability. This may correspond to a multi-subnet on the same network interfaces of the primary media device 210-1 and the secondary media device 212-1. Thus, the special-purpose architecture supports the use of link to reduce dependency on a router 115-1 and Internet connection to provide reliable A/V services. Even if an implementation includes a router 115-1, the link-local architecture may keep the A/V services stable no matter how the router 115-1 behaves (e.g., enters a bad state not be assigned IP address, changes IP addresses to client devices, etc.) to maintain a robust A/V stream between the primary media device 210-1 and the secondary media device 212-1. The multiple subnet method of A/V stability controls may be employed with all the different types of connections employed by the primary media device 210-1 and the secondary media device 212-1 to control the quality of streaming of encrypted A/V between the primary media device 210-1 and the secondary media device 212-1.

Figure 4:
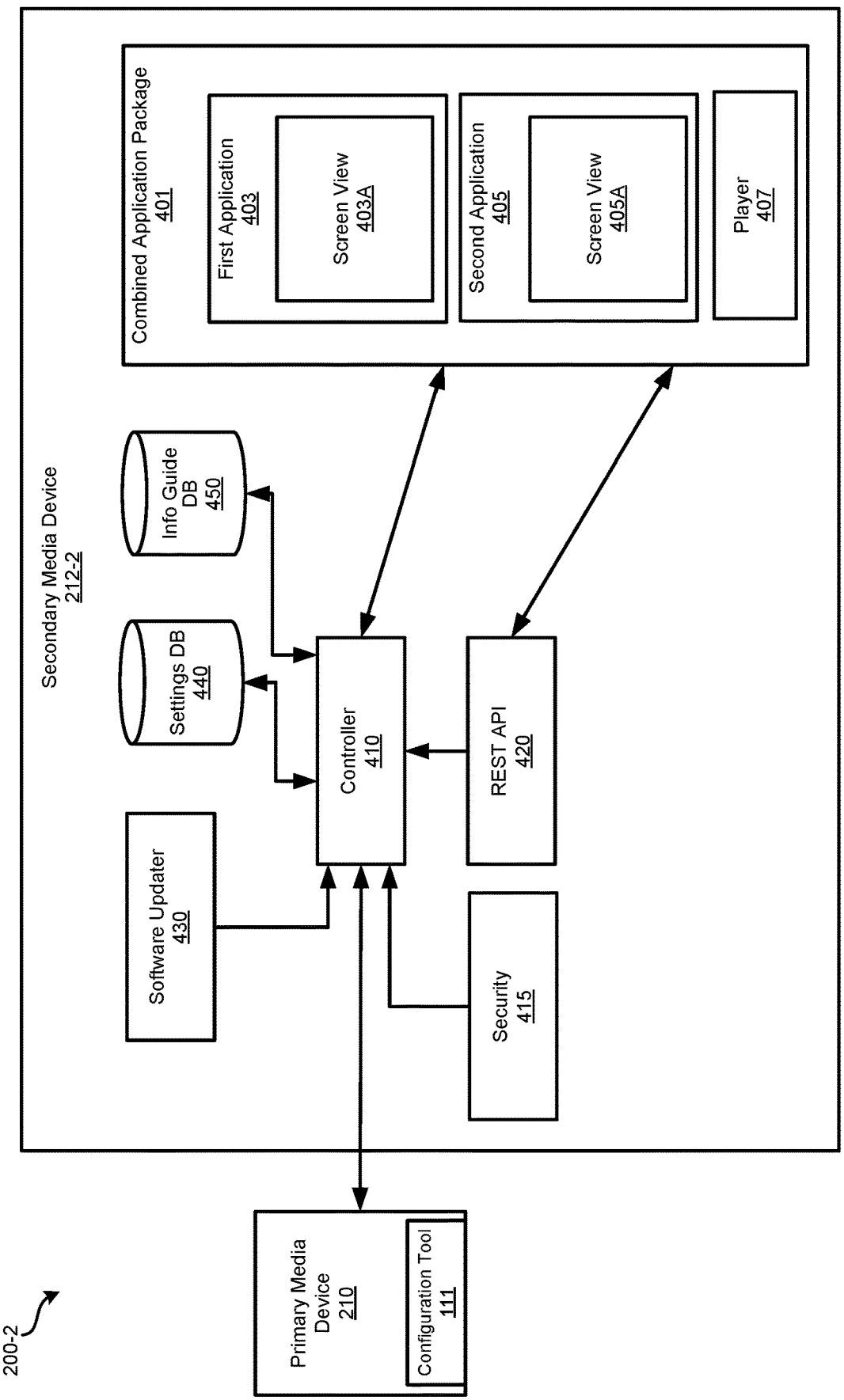
FIG. 4 illustrates an example block diagram of certain other aspects of the primary media device configured with the configuration tool serving a secondary media device in the client-server A/V streaming architecture, in accordance with disclosed embodiments according to the present disclosure.

The client-server architecture 200 may further allow for other advantageous features. FIG. 4 illustrates an example block diagram of certain other aspects of the primary media device 210 configured with the configuration tool 111 serving a secondary media device 212-2 in the client-server A/V streaming architecture 200, in accordance with disclosed embodiments according to the present disclosure. The secondary media device 212-2 may include a combined application package 401, a controller 410, one or more REST APIs 420, a security module 415, a software updater 430, a settings database 440, and an information guide database 450. The combined application package 401 may include a first application 403, a second application 405, and a player 407. In some embodiments, the first application 403 may be independent and different than the second application 405.

One or more processors may execute instructions to provide the security module 415. The security module 415 may facilitate the provisioning of encrypted content in the client-server architecture 200. The primary media device 110 may likewise include a security module to facilitate the provisioning of the encrypted content. The encryption may be specific to the device 114, 214. For example, the encryption may be specific to the Android TV in some embodiments. Security modules 415 may provide the capabilities securing the streaming within the local network 221 and with respect to one or more sessions. The security modules 415 may be configured address security needs including, but not limited to, ensuring authorization and authentication of the primary media device 210, the secondary media device 212-2, other client devices 214, entitlements to content, and otherwise securing A/V content stream within the local network 221. In various embodiments, the security module 415 may operate separately and/or in conjunction with security components provided by other components of the primary media device 210, the secondary media device 212-2, other client devices 214, and/or those provided by backend systems such as the service provider systems 102.

In some embodiments, the security modules 415 may be configured to utilize a common household DRM key. Such common household key may facilitate access to content stored, in encrypted form, on each of the devices participating in the local network 221. In some embodiments, a unique DRM key may be required to access unique content. In some embodiments, the security modules 415 on the devices 210, 212-2 in the local network 221 may be configured to utilize other security keys, inter-device keys, for securing communications over the local network 221. Such inter-device keys may be based on various information, such as a customer billing number, a customer identifier, and/or other information, may be randomly generated, or otherwise. In some embodiments, as devices join and/or leave the local network 221, one or more security keys may be dynamically adjusted, modified, or otherwise processed.

The software updater 430 may be configured to allow the secondary media device 212-2 to obtain software updates from the primary media device 210, with the primary media device 210 operating as a server for the secondary media device 212-2. For example, the software updater 430 may obtain updated application packages and system image files from the primary media device 210, decrypt them, and install them in the secondary media device 212-2. In some embodiments, the software updater 430 may download and install the software packages in the background using flash partitions. The secondary media device 212-2 may include the controller 410 that may be configured to provide services to manage TV sessions associated with the primary media device 210, and to provide for connection ID management. In some embodiments, the controller 410 may include, use, or otherwise correspond to the control application 344. When a channel change or playback operation is requested from a user-facing application, the controller 410 may perform a lookup of the IP address of the primary media device 210, and thereafter create a connection to the primary media device 210.

In some embodiments, the controller 410 may be configured to provide a multi-layered (also referred to herein as a picture on top of a picture (POP)) user interface (UI) features on top of a video layer. The POP feature(s) may be achieved by molding a first UI associated with the first application 403, and a second UI associated with the second application 405. The POP functionality may be achieved via an underlying messaging system utilized by the different components of the secondary media device 212-2. In some embodiments, the controller 410 may communicate with databases such as the settings database 440 and the information guide database 450. The settings database 440 may be configured to at least store information pertaining to device settings (e.g., display screen size, display settings, etc.) of a television 114 associated with the secondary media device 212-2. The information guide database 450 may be configured to store information pertaining to programming media guide information (e.g., a TV guide).

The first application 403 may be included in the combined application package 401, and the secondary media device 212-2 may be configured to facilitate a first UI (i.e., a first screen) associated with the first application 403. In some examples, the first UI may include a representation of content such as web applications downloaded by the secondary media device 212-2, and/or a display of different programs (i.e., content) offered by a content service provider 102. The different programs may be arranged in a tile formation, wherein each tile includes information of the respective content provided by the service provider. In some embodiments, the first application 403 may cause display of installed applications received from the software repository system and may allow them to be launched.

In some embodiments, the first UI associated with the first application 403 may be the initial application seen (by a user) when the smart TV 114 starts. Additionally, the first application 403 may be configured to check whether the current mode is a standby mode when the television 114 boots in order to avoid using tuners on PTR devices when not needed. The second application 405 may be associated with a second UI such as a guide screen, DVR screens, on-demand screens, etc. The player 407 included in the combined application package 401 of the secondary media device 212-2 may be configured to facilitate playing of encrypted content obtained from the primary media device 210, the first application 403, the second application 405, locally issued video trick modes (fast-forward, skip back, etc.), ad insertion, and may handle buffering for IP streaming content passed-through from the primary media device 210.

The secondary media device 212-2 may include a REST API application 420 configured to use APIs to facilitate server-client operations between the secondary media device 212-2 and the primary media device 210. For instance, the REST API 420 may allow the second application 405 to interface with native applications for local control and data and may allow the second application 405 to invoke REST API commands on the primary media device 210 via redirecting http requests to the appropriate host. The REST API application 420 may further allow external control of the secondary media device 212-2 via either remote asynchronous events (RAE) or an open listening port. Additionally, the REST API application 420 may further allow applications to send events to the second application 405. The REST API application 420 may also communicate with a wireless access point.

The multi-layered UI features (i.e., the POP features) may be obtained via the first UI (associated with the first application 403), the second UI (associated with the second application 405), and the player 420. Multi-layered UIs may, for example, allow POP features to provide, for instance, a guide to allow a user to select programs and channels while a currently selected channel is presented as an overlay. Shared video may be built so that a user can go from one set of screens to another and keep the video in a corner without having to restart—similar to transitioning between multiple apps, but grafted together into one interface facilitated by the combined application package 401.

In various embodiments, the multi-layered UIs may further allow for layering and grafting of encrypted A/V and/or other content from multiple, different sources obtained by the primary media device 210 from the multiple, different sources via the network 120 (e.g., the Internet) and/or via the satellite network 122 (e.g., from the service provider systems 102). The primary media device 210 may serve combinations of content from the different sources to the secondary media device 212-2. The secondary media device 212-2 may simultaneously present the combinations of content in the multi-layered UI (e.g., picture-in-picture, tiled format, overlays, and/or the like). Accordingly, the secondary media device 212-2 may simultaneously present first content from the Internet with second content obtained via satellite in the multi-layered UI, where the first content may be presented picture-in-picture with the second content or vice versa, the first content in the second content may be presented in tiles, the first content may be presented as an overlay on the same content or vice versa, and/or the like.

The combined application package 401, which may include the first application 403 associated with a first UI 403A, the second application 405 associated with second UI 405A, and the player 407, may utilize a messaging framework to communicate with the controller 410 in order generate a video signal. Specifically, the combined application package 401 may utilize a plurality of display layers (also referred to herein as a stack of display layers) and may determine via messaging, a positioning of each display layer within the stack of display layers. The secondary media device 212-2 may be configured to generate a video signal based on the plurality of display layers.

In some embodiments, the controller 410 may receive content (e.g., a video from the primary media device 210) and transmit the video to the player 407. The player 407, in turn, may assign the video to a first display layer of the plurality of display layers (i.e., the stack of display layers). Upon receiving a trigger signal (e.g., a first trigger signal from a remote control device that is communicatively coupled with the secondary media device) the first application 403 of the combined application package 401, may assign the first UI 403A associated with the first application to a second display layer of the stack of the display layers. The first application 403 may further position the second display layer to be above the first display layer. The first trigger signal may correspond to a signal that is generated upon the user making a selection with respect to the remote control (e.g., the user pressing a DVR button on the remote control).

Consequently, in response to receiving another trigger signal (e.g., a second trigger signal), the first application 403 may transmit a message to the second application 405. The transmitted message may correspond to a message, which instructs the second application 405 to assign the second UI 405A to a third display layer of the stack of display layers and position the third display layer over the second display layer. The second trigger signal may correspond to a signal that is generated upon the user selecting one of the tiles included in the first UI 403A via the remote control.

The second application 405 may transmit an HTTP request to a web server (e.g., via REST API 420). The HTTP request may correspond to, for instance, a request to resize the video (e.g., assigned to the first display layer), a channel change request, or a playback request. In some embodiments, the REST API 420, upon receiving the HTTP request(s), may extract HTTP data from the request and convert the extracted data into a format that is accepted by the controller 410 (e.g., a native Android format). Based on the type of request, the controller 410 may execute the request and transmit the request to the player 407, or the primary media device 210. For instance, a resize request may be executed by the controller 410 and transmitted directly to the player 407, whereas a request for a channel change or a playback request may be transmitted by the controller 410 to the primary media device 210 in order to obtain the relevant content. The second application 405 may also be configured to issue HTTP requests in order to obtain (e.g., from a database) a list of recordings associated with a certain program. In a similar manner, the controller 410 may also be configured to receive requests from the first application 403. Such requests may, for instance, correspond to requests for a change in channels via user selection of a different tile from the first UI 403A.

In some embodiments, upon the user selecting an icon associated with the second UI 405A, the second application 405 may be configured to switch (or replace) the first video originally assigned to the first display layer with a second video that corresponds to video associated with the selected episode of the program. Furthermore, the second application 405 may resize the second video to correspond to a size of a display screen on which the video is to be presented. In this manner, the combined application package 401 of the secondary media device may utilize a messaging framework (between components of the secondary media device 212-2) to generate a video signal based on the plurality of display layers. Although the first application 403 and the second application 405 are depicted as separate entities, other embodiments are possible. For instance, some embodiments may include a single application having the functionality of both application 403 and application 405. Moreover, further details regarding various embodiments are provided in U.S. patent application Ser. No. 17/546,964, filed Dec. 9, 2021, the entire contents of which are incorporated by reference as if fully set forth herein for all purposes.

Figure 5:
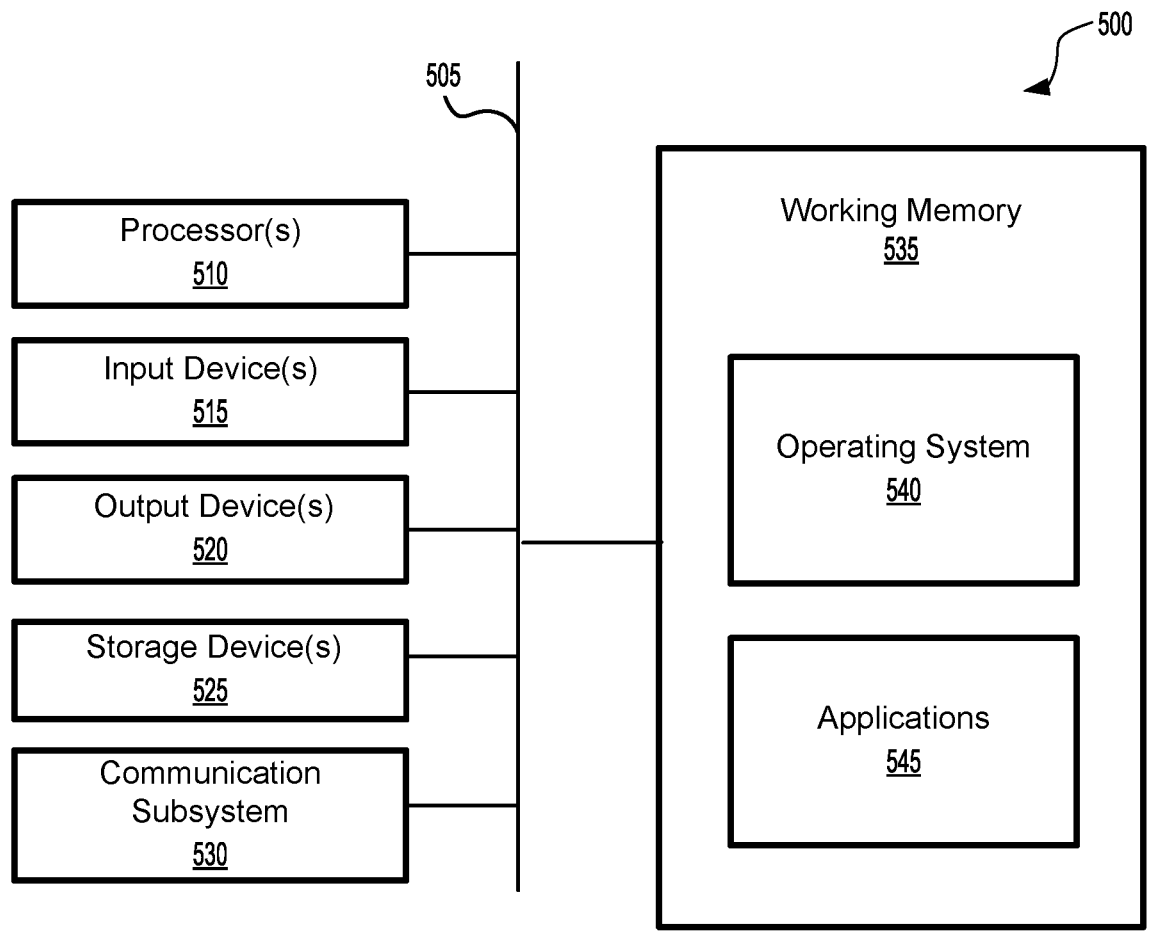
FIG. 5 provides a schematic illustration of one embodiment of a computer system that can implement various system components and/or perform various steps of methods provided by various embodiments.

Embodiments of the primary television receiver 110, configuration tool 111, the primary media device 210, secondary television receiver 112, the secondary media device 212, and/or components thereof, can be implemented on, and/or can incorporate one or more computer systems or at least one or a combination of elements of a computer system as illustrated in FIG. 5. FIG. 5 provides a schematic illustration of one embodiment of a computer system 500 that can implement various system components and/or perform various steps of methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown including hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, video decoders, and/or the like).

As illustrated, some embodiments include one or more input devices 515 and/or output devices 520. The computer system 500 is configured to interface with additional computers, such that the input devices 515 and/or output devices 520 include various physical and/or logical interfaces (e.g., ports, etc.) to facilitate computer-to-computer interaction and control. Embodiments of the input devices 515 and output devices 520 can be configured to implement the television receivers (e.g., the STR 112, the secondary media device 212, the PTR 110 configured with the configuration tool 111, the primary media device configured with the configuration tool 111), so that the computer system 500 can interface with televisions 114, or other receivers in the local network 121.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 525 include the non-transient memory. In some embodiments, the storage devices 525 can include one or more of the settings database 240, and the information guide database 250.

The computer system 500 can also include a communications subsystem 530, which can include, without limitation, any suitable antennas, transceivers, modems, network cards (wireless or wired), infrared communication devices, wireless communication devices, chipsets (such as a Bluetooth™ device, an 802.11 device, a WiFi device, a WiMAX device, cellular communication device, etc.), and/or other communication components. As illustrated, the communications subsystem 530 generally includes any suitable components for facilitating communications with network 120, televisions 114, satellite dish 108, etc.

In many embodiments, the computer system 500 will further include a working memory 535, which can include a RAM or ROM device, as described herein. The computer system 500 also can include software elements, shown as currently being located within the working memory 535, including an operating system 540, device drivers, executable libraries, and/or other code, such as one or more application programs 545, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

In some embodiments, the operating system 540 and the working memory 535 are used in conjunction with the one or more processors 510 to implement features of the STR 112. Embodiments of the one or more processors 510 can implement one or methods executed by a receiver (e.g., the PTR 110 configured with the configuration tool 111, the primary media device 110 configured with the configuration tool 111, the STR 112, the secondary media device 212), such that the operating system 540 and the working memory 535 can implement features of the PTR 110 configured with the configuration tool 111, the primary media device 110 configured with the configuration tool 111, the STR 112, and/or the secondary media device 212. In some embodiments, the working memory 535 includes non-transient, processor-readable memory having instructions stored thereon, which, when executed, cause the one or more processors 510 to perform steps including: adapting a configuration tool to configure a primary media device to perform operations with respect to a local network, and to communicatively couple with the primary media device via at least one interface to configure the primary media device to perform the operations with respect to the local network; where the primary media device configured with the configuration tool: operates as a server in the local network, receives first audio/video (A/V) content via an Internet connection and/or a satellite network connection, and receives second A/V content via the Internet connection and/or the satellite network connection; and serves the first A/V content and the second A/V content to at least one secondary media device of a set of one or more secondary media devices that provides the first A/V content and the second A/V content for display with at least one television of a set of one or more televisions.

A set of these instructions and/or codes can be stored on a non-transitory computer-readable storage medium, such as the non-transitory storage device(s) 525 described above. In some cases, the storage medium can be incorporated within a computer system, such as computer system 500. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computer system 500 and/or can take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 500) to perform methods in accordance with various embodiments of the disclosure. According to a set of embodiments, some or all of the procedures of such methods are performed by the computer system 500 in response to processor 510 executing one or more sequences of one or more instructions (which can be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 can cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media can be involved in providing instructions/code to processor(s) 510 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 500. The communications subsystem 530 (and/or components thereof) generally will receive signals, and the bus 505 then can carry the signals (and/or the data, instructions, etc., carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system to facilitate streaming in a local network with a client-server architecture, the system comprising:
   a configuration tool comprising:
      one or more processing devices;
      one or more interfaces to communicatively couple with a primary media device, wherein the primary media device is configured to output A/V content for display with at least one television of a set of one or more televisions;
      memory communicatively coupled with and readable by the one or more processing devices and having stored therein processor-readable instructions which, when executed by the one or more processing devices, configure a primary media device to perform operations with respect to a local network;
      where the configuration tool is adapted to communicatively couple with the primary media device via at least one interface of the one or more interfaces to configure the primary media device to extend an ability of the primary media device to provide for connection identifier management for device-specific sessions for secondary media devices;
   the primary media device, where the primary media device configured with the configuration tool:
      operates as a server in the local network;
      receives first audio/video (A/V) content via one or both of an Internet connection and a satellite network connection;
      receives second A/V content via one or both of the Internet connection and the satellite network connection; and
      serves the first A/V content and the second A/V content to at least one secondary media device of a set of one or more secondary media devices that provides the first A/V content and the second A/V content for display with at least one other television of the set of one or more televisions.

2. The system to facilitate streaming in a local network with a client-server architecture as recited in claim 1, where the configuration tool is adapted to connect with the primary media device with a universal serial bus (USB) connection to configure the primary media device for the operations with respect to the local network.

3. The system to facilitate streaming in a local network with a client-server architecture as recited in claim 1, where the configuration tool and the primary media device perform discovery operations with respect to one another consequent to the configuration tool being communicatively coupled to the primary media device.

4. The system to facilitate streaming in a local network with a client-server architecture as recited in claim 3, where, consequent to completion of the discovery operations, the configuration tool automatically configures the primary media device to perform the operations with respect to the local network.

5. The system to facilitate streaming in a local network with a client-server architecture as recited in claim 4, where the configuring the primary media device to perform the operations with respect to the local network comprises transitioning the primary media device from a first operational mode to a second operational mode.

6. The system to facilitate streaming in a local network with a client-server architecture as recited in claim 5, where the configuring the primary media device to perform the operations with respect to the local network comprises extending a range of functionalities of the primary media device.

7. The system to facilitate streaming in a local network with a client-server architecture as recited in claim 1, where each secondary media device of the set of one or more secondary media devices operates as a client with respect to the primary media device in the local network.

8. The system to facilitate streaming in a local network with a client-server architecture as recited in claim 1, where the primary media device transmits the first A/V content and the second A/V content to the at least one secondary media device via a Wi-Fi connection.

9. The system to facilitate streaming in a local network with a client-server architecture as recited in claim 1, where the primary media device transmits the first A/V content and the second A/V content to the at least one secondary media device via a coaxial connection.

10. A method to facilitate streaming in a local network with a client-server architecture, the method comprising:
   adapting a configuration tool to configure a primary media device to perform operations with respect to a local network, and to communicatively couple with the primary media device via at least one interface to configure the primary media device to extend an ability of the primary media device to provide for connection identifier management for device-specific sessions for secondary media devices;
   where the primary media device configured with the configuration tool:
      operates as a server in the local network;

receives first audio/video (A/V) content via one or both of an Internet connection and a satellite network connection;

receives second A/V content via one or both of the Internet connection and the satellite network connection; and serves the first A/V content and the second A/V content to at least one secondary media device of a set of one or more secondary media devices that provides the first A/V content and the second A/V content for display with at least one television of a set of one or more televisions.

11. The method to facilitate streaming in a local network with a client-server architecture as recited in claim 10, further comprising adapting the configuration tool is adapted to connect with the primary media device with a universal serial bus (USB) connection to configure the media device for the operations with respect to the local network.

12. The method to facilitate streaming in a local network with a client-server architecture as recited in claim 10, further comprising adapting the configuration tool to cause discovery operations with respect to the primary media device consequent to the configuration tool being communicatively coupled to the primary media device.

13. The method to facilitate streaming in a local network with a client-server architecture as recited in claim 12, where, consequent to completion of the discovery operations, the configuration tool automatically configures the primary media device to perform the operations with respect to the local network.

14. The method to facilitate streaming in a local network with a client-server architecture as recited in claim 13, where the configuring the primary media device to perform the operations with respect to the local network comprises transitioning the primary media device from a first operational mode to a second operational mode.

15. The method to facilitate streaming in a local network with a client-server architecture as recited in claim 14, where the configuring the primary media device to perform the operations with respect to the local network comprises extending a range of functionalities of the primary media device.

16. The method to facilitate streaming in a local network with a client-server architecture as recited in claim 10, where each secondary media device of the set of one or more secondary media devices operates as a client with respect to the primary media device in the local network.

17. The method to facilitate streaming in a local network with a client-server architecture as recited in claim 10, where the primary media device transmits the first A/V content and the second A/V content to the at least one secondary media device via a Wi-Fi connection.

18. The method to facilitate streaming in a local network with a client-server architecture as recited in claim 10, where the primary media device transmits the first A/V content and the second A/V content to the at least one secondary media device via a coaxial connection.

19. One or more non-transitory, machine-readable media having machine-readable instructions thereon which, when executed by one or more processing devices, cause the one or more processing devices to:

configure a primary media device to extend an ability of the primary media device to provide for connection identifier management for device-specific sessions for secondary media devices;

where the configured primary media device:

operates as a server in a local network;

receives first audio/video (A/V) content via one or both of an Internet connection and a satellite network connection;

receives second A/V content via one or both of the Internet connection and the satellite network connection; and serves the first A/V content and the second A/V content to at least one secondary media device of a set of one or more secondary media devices that provides the first A/V content and the second A/V content for display with at least one television of a set of one or more televisions.

20. The one or more non-transitory, machine-readable media as recited in claim 19, where the configuring the primary media device to perform the operations with respect to the local network comprises transitioning the primary media device from a first operational mode to a second operational mode.

\* \* \* \* \*